(12) United States Patent
Kuo et al.

(10) Patent No.: US 7,855,261 B2
(45) Date of Patent: Dec. 21, 2010

(54) ALDEHYDE REMOVAL

(75) Inventors: Thauming Kuo, Kingsport, TN (US); Mark Kevin Vineyard, Blountville, TN (US); Weimin Chen Liang, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 925 days.

(21) Appl. No.: 11/636,254

(22) Filed: Dec. 8, 2006

(65) Prior Publication Data

US 2008/0135060 A1 Jun. 12, 2008

(51) Int. Cl.
C08F 20/06 (2006.01)
A24D 3/10 (2006.01)
A24D 3/08 (2006.01)

(52) U.S. Cl. .................. 526/318.3; 526/318; 526/317.1; 560/178; 560/176; 131/334; 131/345; 131/332; 131/340

(58) Field of Classification Search .................. 526/318, 526/317.1, 318.3; 560/178, 176; 131/334, 131/345, 332, 340
See application file for complete search history.

(56) References Cited

U.S. PATENT DOCUMENTS

| | | | |
|---|---|---|---|
| 2,521,897 A | 9/1950 | Caldwell | |
| 2,829,027 A | 4/1958 | Raynolds et al. | |
| 2,838,364 A | 6/1958 | Smith | |
| 3,033,698 A | 5/1962 | Kiefer et al. | |
| 3,227,164 A * | 1/1966 | McConnell et al. | 131/343 |
| 3,251,365 A | 5/1966 | Keith, II et al. | |
| 3,554,987 A | 1/1971 | Smith | |
| 3,734,874 A | 5/1973 | Kibler et al. | |
| RE28,858 E | 6/1976 | Litzinger | |
| 4,182,743 A | 1/1980 | Rainer et al. | |
| 4,427,836 A | 1/1984 | Kowalski et al. | |
| 4,468,498 A | 8/1984 | Kowalski et al. | |
| 4,517,111 A | 5/1985 | Dorman et al. | |
| 4,522,953 A | 6/1985 | Barby et al. | |
| 4,532,947 A | 8/1985 | Caseley | |
| 4,753,250 A | 6/1988 | Bitter et al. | |
| 4,892,719 A | 1/1990 | Gesser | |
| 5,009,239 A | 4/1991 | Cohen et al. | |
| 5,160,503 A | 11/1992 | Smith | |
| 5,194,674 A | 3/1993 | Pacific | |
| 5,206,204 A | 4/1993 | Tsutsumi et al. | |
| 5,268,502 A | 12/1993 | Pacifici | |
| 5,292,877 A | 3/1994 | Edgar et al. | |
| 5,352,274 A | 10/1994 | Blakley | |
| 5,360,843 A | 11/1994 | Edgar et al. | |
| 5,391,624 A | 2/1995 | Rasoul et al. | |
| 5,420,267 A | 5/1995 | Edgar et al. | |
| 5,446,195 A | 8/1995 | Pacifici | |
| 5,521,304 A | 5/1996 | Edgar et al. | |
| 5,527,613 A | 6/1996 | Blankenship et al. | |
| 5,595,591 A | 1/1997 | Edgar et al. | |
| 5,603,927 A | 2/1997 | Fukumoto et al. | |
| 5,612,230 A | 3/1997 | Yuzurihara et al. | |
| 5,616,764 A | 4/1997 | Lavoie et al. | |
| 5,767,199 A | 6/1998 | Bors et al. | |
| 5,770,726 A | 6/1998 | Kuo et al. | |
| 5,795,933 A | 8/1998 | Sharp et al. | |
| 5,830,414 A | 11/1998 | Ishii et al. | |
| 5,863,652 A | 1/1999 | Matsumura et al. | |
| 5,913,311 A | 6/1999 | Ito et al. | |
| 6,184,373 B1 | 2/2001 | Bernard et al. | |
| 6,481,442 B1 | 11/2002 | Dyakonov et al. | |
| 6,506,696 B2 | 1/2003 | Goldstein et al. | |
| 6,595,218 B1 | 7/2003 | Koller et al. | |
| 6,780,523 B2 | 8/2004 | Kuo et al. | |
| 2004/0123874 A1 | 7/2004 | Zawadzki et al. | |

FOREIGN PATENT DOCUMENTS

| | | |
|---|---|---|
| EP | 1 470 760 A1 | 10/2004 |
| GB | 940954 | 11/1963 |
| JP | 57-032729 A | 2/1982 |
| JP | 58-059263 A | 4/1983 |
| JP | 09 272059 | 4/1999 |
| JP | 11 089920 A | 4/1999 |
| JP | 11 197502 | 7/1999 |
| JP | 11-300902 | * 11/1999 |
| JP | 11 300902 | 11/1999 |
| JP | 11-300902 A | 11/1999 |
| WO | WO 98/27147 A1 | 6/1998 |

(Continued)

OTHER PUBLICATIONS

Notification of Transmittal of the International Search Report and the Written Opinion of the International Searching Authority, or the Declaration date of mailing Nov. 5, 2008 received in International Application No. PCT/US2007/024183.

(Continued)

Primary Examiner—Ling-Siu Choi
(74) Attorney, Agent, or Firm—Michael K. Carrier; Bernard J. Graves, Jr.

(57) ABSTRACT

Disclosed are filter elements constructed of a filter support material coated with an acetoacetate-functional polymeric composition that reacts with and removes aldehydes, especially formaldehyde, present in gases such as air. Also disclosed are methods for the removal of aldehydes utilizing the coated filter support materials.

12 Claims, No Drawings

FOREIGN PATENT DOCUMENTS

WO     WO 00/25611 A1     5/2000

OTHER PUBLICATIONS

Invitiation to Pay Additional Fees date of mailing Jun. 6, 2008 on International Application No. PCT/US2007/024183.

Invitation to Pay Additional Fees date of mailing Jun. 26, 2008 on International Application No. PCT/US2007/024135.

Invitation to Pay Additional Fees date of mailing Jun. 26, 2008 on International Application No. PCT/US2007/024136.

Gray, M. L. et al.; "Capture of carbon dioxide by solid amine sorbents"; Int. J. Environmental Technology and Management; vol. 4; Nos. 1/2; 2004; pp. 82-85.

Lowman, Douglas, "Characterization of Cellulose Esters by Solution-State and Solid-State NMR Spectroscopy", ACS Symposium Series (1988), 688 (Cellulose Derivatives), pp. 131-162.

Tomasino, Charles et al.; "Evaluation of Formaldehyde Scavengers"; Textile Chemist and Colorist; vol. 16, No. 12, pp. 33-38, Dec. 1984.

Witzeman, J. Stewart et al; "Comparison of Methods for the Preparation of Acetoacetylated Coating Resins"; Journal of Coatings Technology, vol. 62, No. 789, pp. 101-112 (1990).

Co-pending U.S. Appl. No. 11/635,988, filed Dec. 8, 2006.

Co-pending U.S. Appl. No. 11/636,255, filed Dec. 8, 2006.

Co-pending U.S. Appl. No. 11/635,993, filed Dec. 8, 2006.

Notification of Transmittal of the International Search Report and the Written Opinion of the International Searching Authority, or the Declaration date of mailing Oct. 1, 2008 for International Application No. PCT/US2007/024184.

* cited by examiner

ALDEHYDE REMOVAL

FIELD OF THE INVENTION

This invention relates to compositions which are effective for the removal of aldehydes from gases. More specifically, this invention pertains to filter elements comprising substrates coated with an acetoacetate-functional polymeric material that reacts with and removes aldehydes present in gases such as air. This invention also relates to coated air filter media fabricated from the coated substrates which are capable of irreversibly removing airborne aldehydes, such as formaldehyde, acetaldehyde, and acrolein. This invention also relates to a method for the removal of a gaseous aldehyde from a gas by contacting the gas with a substrate coated with an acetoacetate-functional compound.

BACKGROUND OF THE INVENTION

Formaldehyde is a common indoor pollutant existing in homes, offices, public buildings, etc. It is a highly reactive chemical and can cause health problems such as headache, dizziness, nausea, and irritations of the eyes, respiratory passages and skin. A major source of formaldehyde emissions is the building materials such as plywood, particleboard, paneling, laminates, carpet glues, and wallpaper containing urea-formaldehyde adhesives. Examples of other sources of formaldehyde include foam insulation materials, paints, and coatings in which formaldehyde-based resins are present. The formaldehyde gas emissions may result from the presence of unreacted formaldehyde in the resins or from degradation of the cured resins.

Various technologies have been cited in the prior art for the purpose of removing airborne formaldehyde. U.S. Pat. No. 5,352,274 discloses air filtration utilizing a plurality of corrugated base sheets which are stacked or nestled and which have entrapped carbon dust for adsorption of impurities such as formaldehyde, acetaldehyde, and acrolein. The corrugated structure provides very little pressure drop as the air passes through available channels and large, powerful fans are not necessary to move air therethrough. This technology provides a method to adsorb formaldehyde molecules physically but not by chemical reaction.

U.S. Pat. No. 5,830,414 discloses an air cleaning filter comprising activated carbon fibers in the form of a web supporting at least one kind of chemical reagent selected from the group consisting of (a) an alkali agent selected from a hydroxide or carbonate of an alkali metal, (b) an acidifying agent selected from acid aluminum phosphate or phosphoric acid, and (c) an oxidizing agent composed of active manganese dioxide resulting from an alkali permanganate and an alkali iodate. This patent discloses the treatment of carbon fibers with an active small molecule such as a strong acid, strong base, or strong oxidizing agent. These chemicals can only be used to treat fibers having high chemical resistances such as activated carbon fibers. Further, fibers thus treated are potentially hazardous to handle.

U.S. Pat. No. 4,517,111 provides a composition comprising a permanganate salt adsorbed onto a solid alkaline support useful for irreversible removing formaldehyde from air. The composition can be employed in molded, pellet, particle, or power form as, for example, in a respirator filter cartridge. The application of this technology is limited to the solid forms as stated. U.S. Pat. No. 4,892,719 discloses a method of reducing the indoor air concentration of aldehydes by coating a porous support filter with a water soluble polymeric amine such as polyethyleneimine, polyallylamine, or polyvinylamine. The coating is further plasticized with a low volatile liquid such as glycerol in order to extend the useful life of the coating. This technology has a deficiency in that the reactive component, i.e., an amine, may be consumed by carbon dioxide present in air. The description of the reaction of carbon dioxide with amine adsorbents may be found in *Int. J. Environmental Technology and Management*, Vol. 4, Nos 1/2, 2004, p. 82. Furthermore, the reaction product of said polyamine and formaldehyde has the same end group as has urea-formaldehyde and, as a result, over time will undergo the same degradation to release formaldehyde.

It is known that compounds having active methylene groups are capable of reacting with formaldehyde. JP 57,032, 729 describes a method for removal of residual formaldehyde in microcapsule dispersion by adding a compound having an active methylene group such as methyl acetoacetate, ethyl acetoacetate, or diethyl malonate. Active methylene compounds also have been used as formaldehyde scavengers in the textile industry to reduce the amount of formaldehyde released from durable press-treated fabrics as described in *Textile Chemist and Colorist*, Vol. 16, No. 12, p. 33, December 1984 (published by the American Association of Textile Chemists and Colorists). Such a compound is added to finishing formulations of the fabrics to react with formaldehyde released from urea-formaldehyde resins used for cellulose crosslinking. Dimethyl 1,3-acetonedicarboxylate having two highly activated methylene groups was found to be most effective.

U.S. Pat. No. 5,160,503 discloses a water-soluble blend composition for scavenging formaldehyde in textile fabrics. The composition consists of a substituted or unsubstituted polyhydric alcohol such as diethylene glycol and an active methylene compound selected from the group consisting of dialkyl malonates and alkyl acetoacetates. U.S. Pat. Nos. 5,194,674; 5,268,502; and 5,446,195 disclose that water-soluble compositions prepared by reacting a glycol or polyether with an acetoacetate or malonate may be used as formaldehyde scavengers in the fabric finishing formulations. Again, in these references, liquid reaction media are required for the effective removal of formaldehyde.

Formaldehyde scavengers containing active methylene hydrogens also may be added to coating compositions containing urea/formaldehyde or melamine/formaldehyde resin to reduce formaldehyde concentration. U.S. Pat. No. 5,795, 933 discloses a waterborne coating compositions comprising a formaldehyde-containing resin and a formaldehyde scavenger containing active methylene hydrogen with a pKa of about 5 to 13.

The reaction of acetoacetate-functional polymers with formaldehyde also has been cited in the prior art. JP 58,059, 263 describes a curable polymer composition consisting of a water soluble polymer, a water soluble polymer having an acetoacetate group such as acetoacetylated polyvinyl alcohol resin, and a crosslinking agent capable of reacting with the acetoacetate group such as formaldehyde or glyoxal. U.S. Pat. No. 5,767,199 discloses an air-curing composition containing an acetoacetate functional polymer and an end-blocked polyformaldehyde chain. According to the patent, the composition is stable to reaction until the formaldehyde is released from the polyformaldehyde chain. These references relate to either the utilization of active methylene compounds to remove formaldehyde in a liquid mixture or to suppress formaldehyde emission by mixing a formaldehyde scavenger with formaldehyde-containing resins. None of the references pertain to air filter applications.

Cigarette smoke resulting from tobacco combustion contains numerous gaseous and particulates compounds. The gaseous molecules are responsible for both the pleasure and the health risk derived from the use of tobacco smoke. Among the many molecules produced by combustion or vaporization of tobacco are nicotine, carbon monoxide, ammonia, aldehydes such as formaldehyde, acetaldehyde, and acrolein, and added flavor compounds and combustion products thereof. Cigarette filters are utilized in an effort to remove undesirable gases and particulates from tobacco smoke while retaining the flavor and taste essential to the enjoyment of smoking. Selective removal of gaseous molecules from tobacco smoke is required for an effective active, tobacco smoke filtration material. Active materials such as activated carbon, silica gel, alumina, and zeolites commonly used for the removal of gaseous contaminates are not particularly suitable for this purpose. Although these materials can remove certain gaseous compounds, they also may adsorb compounds considered desirable for acceptable cigarette flavor. Moreover, adsorption by these porous materials is not totally effective since the gaseous compounds are only physically bound to the surface of the porous materials and are not chemically reacted. In addition to selective adsorption of gaseous compounds, active tobacco smoke filter materials also should be light weight, low cost, stable in air, exhibit low pressure drop, safe to handle, and ease of fabrication.

U.S. Pat. No. 6,595,218 discloses a tobacco smoke filter comprising a reagent consisting essentially aminoethylaminopropylsilyl silica gel or aminoethylaminoethyl-(aminopropyl)silyl silica gel wherein the reagent chemically reacts with and removes a gaseous component such as an aldehydes from tobacco smoke. U.S. Pat. No. 6,481,442 discloses a smoking article comprising a wrapper and a selective filter element having at least one carrier and a polyaniline having a plurality of moieties selected from the group consisting of an amino group, an imino group, a hydrazide group, a hydrazone group, a semicarbazide group and combinations thereof capable of reacting with carbonyl-containing combustion products of tobacco. Optionally, a spacer, having the composition —CO—[$CH_2$]$_n$—CO—, wherein n has a value from 1 to 4 or greater than 4, may be used to attach active moieties containing amino groups to the carrier. The spacer is used for the purpose of extending out the chemically active amino moieties from the carrier.

U.S. Pat. No. 4,182,743 discloses a gas-permeable substrate, particularly adapted for the selective removal of aldehydes form gases comprising a granular-containing concentrated hydrogen peroxide, water and a hydrophilic stabilizer for the hydrogen peroxide. U.S. Pat. No. 4,753,250 discloses a process for producing cigarette filters comprising a compound containing L-ascorbic acid to react with and remove aldehydes. U.S. Pat. No. Re. 28,858 discloses an improved tobacco smoke filter material comprising a porous particulate carrier impregnated with polyethylene-imine for the removal of volatile smoke acids and aldehydes. U.S. Pat. No. 5,009,239 also relates to the removal of aldehydes using polyethyleneimine as the active component in a cigarette filter. For the same purpose, an aminobenzene acid salt is used in U.S. Pat. No. 5,603,927 and an organic salt of mercapto-alkane-sulfonate used in U.S. Pat. No. 4,532,947. Disclosed in U.S. Pat. No. 5,206,204 is an adsorbent for lower aldehydes which comprises a saturated cyclic secondary amine and a halogenide of an alkali metal or alkaline earth metal supported on a porous carrier.

A tobacco smoke filter comprising a plasticizer bonding agent is disclosed in U.S. Pat. No. 3,227,164, wherein the plasticizer is selected from the group consisting of the alkylene glycol, polyalkylene glycol, and glycerol esters of acetoacetic acid. This reference discloses that the tobacco smoke filter is effective in removing phenol and undesirable toxic metal ions such as nickel, cobalt, etc. Aldehydes removal is not mentioned.

BRIEF SUMMARY OF THE INVENTION

We have found that gaseous aldehydes such as formaldehyde, acetaldehyde and acrolein may be removed permanently from air or other gaseous environments or media such as tobacco smoke by contacting a gas containing one or more aldehydes with a filter medium comprising a substrate, e.g. a filter support material, and a polymeric composition containing an acetoacetate residue wherein the polymeric composition is selected from condensation polymers such as polyester and polyurethane polymers; addition polymers such as polyacrylate (acrylic), polyolefins and polyvinyl alcohol polymers; epoxy resins; polysiloxanes; cellulose; and cellulose esters. The filter medium permanently removes formaldehyde and other aldehydes from gases such as air and tobacco smoke. Thus, in its broader aspects, the present invention provides a filter element for aldehyde removal comprised or constructed of a filter support material and a polymeric composition containing acetoacetate residues; wherein the polymeric composition is selected from condensation polymers, addition polymers, epoxy resins, polysiloxanes, cellulose and cellulose esters. In another aspect, the present invention provides a method for the removal of a gaseous aldehyde from a gas which comprises contacting a gas containing a gaseous aldehyde with a filter medium or filter element comprising a filter support material coated with a polymeric composition containing acetoacetate residues wherein the polymeric composition is one or more of the above-specified polymers. A method for the removal of a gaseous aldehyde from a gas by contacting a gas containing a gaseous aldehyde with a filter medium or filter element comprising fibers coated with the aforesaid polymeric material containing an acetoacetate residue represents another embodiment of the invention. The present invention is concerned primarily with the removal of formaldehyde from air and the removal of gaseous aldehydes from tobacco smoke.

DETAILED DESCRIPTION OF THE INVENTION

Examples of airborne aldehydes which may be removed in accordance with the present invention include formaldehyde, acetaldehyde, acrolein, and other gaseous aldehyde emissions present in air. Formaldehyde is of particular interest to this invention. The substrate or filter support material may be a fibrous or a porous substrate suitable for air filtration. Example of such substrates are materials fabricated from cotton, cellulose esters, woven and non-woven fabrics, paper, glass, carbon, ceramics, metals and synthetic polymeric materials. Examples of porous substrates are in the forms of sheets, pleated, fluted and corrugated sheets, powders, beads, tubes, membranes, sieves, and screens. A fibrous substrate is preferred. Examples of fibrous substrates include fibers of cellulose esters, glass, cotton, wool, carbon, polyester, polyamide, acrylic, modacrylic, polypropylene, and polyethylene. Such fibrous substrates may be produced by conventional techniques such as solution spinning, melt spinning and melt blowing. The fiber substrates may have various cross-section shapes and thicknesses, e.g., having a denier per filament of about 1 to 20, more typically about 2 to 8.

The filter support or substrate for the tobacco smoke filter may be any material useful in constructing tobacco smoke filters. Examples of tobacco smoke filter materials include fibers derived from cellulose including paper, cellulose acetate, polyester, polyamide, acrylic, modacrylic, polypropylene, and polyethylene. Fibers of cellulose acetate, typically in the form of a continuous fiber tow, are the most common tobacco smoke filter materials. The cellulose acetate normally has a degree of substitution of about 2.3 to 2.8. Other materials typically used in the manufacture of tobacco smoke filters are fiber-to-fiber bonding agents such as triacetin, cellulose based filter material such as paper, plugwrap, fiber-to-plugwrap adhesive, plugwrap hot-melt adhesive, and powderous additives such as activated carbon, silica gel, alumina, and zeolite. A filter cigarette typically consists of two parts—a smoke filter and a tobacco rod. The smoke filter is prepared most commonly using a collection or bundle of cellulose acetate fibers (filter tow). The cellulose acetate fibers are generally produced by a dry spinning process, such as those disclosed in U.S. Pat. Nos. 2,829,027 and 2,838,364. The cellulose acetate fibers typically are dry spun from a cellulose acetate spinning solution containing cellulose acetate and acetone with other optional additives such as titanium dioxide. The dry spinning process of producing the cellulose acetate fibers generally produces fibers having an average denier per filament (dpf) of about 2 to 8, but fibers can be made down to 1 and up to 20 dpf. The spinning process can produce various fiber cross sections, for example a triangular hole is used to form the Y cross section, which is the most common cross section.

The polymeric material, including oligomers, containing acetoacetate residues may be selected from condensation polymers such as polyester and polyurethane polymers; addition polymers such as polyacrylate (acrylic), polyolefins and polyvinyl alcohol polymers; epoxy resins; polysiloxanes; cellulose; and cellulose wsters. Examples of polymeric materials include condensation polymers, e.g., polyesters including unsaturated polyesters and alkyd resins, and polyurethanes; addition polymers, i.e., polymers derived from one or more ethylenically-unsaturated compounds or monomers such as, for example, polyacrylates, including acrylic latexes, polyolefins such as polyethylene and polypropylene and polyvinyl alcohol resins, epoxy resins, polysiloxanes, cellulose and cellulose esters. Such acetoacetate-functionalized polymeric materials (AcAc polymers) are capable of reacting with formaldehyde and other gaseous aldehydes to form a stable carbon-carbon bond, thereby permanently removing aldehyde molecules from the air. Further, the AcAc polymers are not reactive with common fibrous materials used to fabricate filter media and therefore are suitable for applying to a variety of fibrous substrates. Accordingly, the filter media of the present invention provides a low-cost, versatile, and effective solution to permanently remove formaldehyde from indoor air emissions. Polyester and polyacrylate polymers containing acetoacetate residues are preferred. Such polyester and polyacrylate polymers typically have a number average molecular weight of at least 600, preferably at least 1000 for the polyesters, and at least 8,000, preferably at least 15,000, for the polyacrylate.

AcAc polymeric materials having a lower glass transition temperature (Tg), e.g., Tg<30° C., typically from about −20 to 20° C., are advantageous in providing good adhesion to the filter support material. However, polymeric materials having a higher Tg, e.g., Tg>30° C., typically from about 40 to 100° C., also may be used to coat fibrous filter support materials providing that the resulting dried polymer particles are small enough to be entrapped in the fibers. Such filter support fibers coated with micro- or nano-particles are advantageous in providing larger surface area and lower pressure drop. Polymeric materials having higher Tg's typically do not form a continuous film but instead form fine particles when dried Such a polymeric material may be spray dried onto a substrate from a polymer dispersion. The AcAc polymers may be prepared by reacting a polymer containing hydroxyl groups, e.g., a polymer having a hydroxyl number of at least 5, preferably about 25 to 180 with an alkyl acetoacetate or diketene. Acid and hydroxyl numbers are determined by titration and are reported herein as mg KOH consumed for each gram of polymer. Various methods for the preparation of acetoacetylated polyester coating resins have been described by Witzeman et al. in the *Journal of Coatings Technology*, Vol. 62, No. 789, pp. 101-112 (1990). Suitable alkyl acetoacetates for the reaction with (esterification of) a hydroxyl-containing polymer include t-butyl acetoacetate, ethyl acetoacetate, methyl acetoacetate, isobutyl acetoacetate, isopropyl acetoacetate, n-propyl acetoacetate, and n-butyl acetoacetate. t-Butyl acetoacetate is preferred.

The AcAc polymeric material may be an acetoacetate-functionalized polyester resin comprising the reaction product of (a) from about 60 to about 97 weight percent of a polyester resin and (b) from about 3 to about 40 weight percent of an alkyl acetoacetate or diketene, each as described herein, wherein the weight percents are based on the total weight of (a) and (b). The polyester resin of component (a) has a hydroxyl number of at least 5; the preferred hydroxyl number is at least 15 and the most preferred being at least 25. The acetoacetate-functionalized polyester resins include waterborne, AcAc-modified polyesters containing the residue of one or more hydrophilic monomers such as 5-sodiosulfoisophthalic acid (SSIPA) or by neutralization of polyesters having a higher acid number, e.g., acid numbers >50, with a base. As used herein, neutralization of a polymer means to neutralize carboxylic acid end groups or AcAc residues. Neutralization of carboxylic acid end groups may render the polymer water-dispersible through ionic group formation, where the final pH may still be <7. On the other hand, neutralization of AcAc functionality typically results in an increase of the pH to >7, preferably about 7.5 to 11, to increase the reactivity toward formaldehyde Waterborne AcAc-modified polyesters also may be prepared by emulsification in water in the presence of a surfactant. Examples of the waterborne, AcAc-modified polyesters and methods for the preparation thereof are been described in U.S. Pat. No. 6,780,523, the content of which is incorporated herein by reference.

The waterborne, AcAc-modified polyesters containing sulfonate groups exhibit a structure of polymeric surfactants, which are particularly effective in absorbing molecular contaminants due to their solubilizing ability. Generally, sulfonated waterborne polyester resins may be prepared by reacting a glycol or polyol, a polycarboxylic acid or monocarboxylic acid and a sulfomonomer or sulfomonomer adduct containing at least one sulfo group. The glycol or polyol preferably is selected from aliphatic, alicyclic, and aryl alkyl glycols. Examples of glycols include, but are not limited to, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, and the like. Examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE). The polyacid, e.g., dicarboxylic acids and/or tricarboxylic acids, and monofunctional acid, i.e., monocarboxylic acids, components of the waterborne AcAc-modified polyesters may be any polyacid or monofunctional acid known in the art as useful in the formation of waterborne polyesters. The dicarboxylic acid reactant may be, for example, isophthalic acid, phthalic anhydride or acid, terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, hexahydro-phthalic anhydride, tetrahydrophthalic anhydride, maleic anhydride, fumaric acid, succinic anhydride, succinic acid, 2,6-naphthalenedicarboxylic acid, glutaric acid, and the like. Preferably, the dicarboxylic acid is isophthalic acid, adipic acid, phthalic anhydride, or phthalic acid. The tricarboxylic acid may be, for example, trimellitic anhydride. A monofunctional acid may also be used such as benzoic acid, acetic acid, propionic acid, t-butylbenzoic acid, and butanoic acid.

The sulfomonomer of the sulfomonomer residue typically is either a difunctional or a monofunctional monomer containing a —SO$_3$M group attached to an aromatic nucleus wherein M is hydrogen or a metal ion such as, for example, Na$^+$, Li$^+$, K$^+$, Ca$^{++}$, Cu$^{++}$, Fe$^{++}$, or Fe$^{+++}$. The difunctional sulfomonomers may be a dicarboxylic acid (or a derivative thereof) containing a —SO$_3$M group wherein M is as defined above. Examples of the aromatic nucleus to which the —SO$_3$M group may be attached include, but are not limited to, benzene, naphthalene, anthracene, diphenyl, oxydiphenyl, sulfonyl-diphenyl, and methylenediphenyl. Preferred difunctional monomers comprise the sodium salt of a sulfoisophthalic acid, a sulfoterephthalic acid, a sulfophthalic acid, a 4-sulfo-naphthalene-2,7-dicarboxylic acid or a derivative thereof. More preferably, the difunctional monomer is 5-sodiosulfoisophthalic acid or a derivative such as dimethyl 5-sodiosulfoisophthalate. Other preferred difunctional monomers are lithium 5-sulfoisophthalic acid, dimethyl lithium 5-sulfoisophthalate, potassium 5-sulfoisophthalic acid, and dimethyl potassium 5-sulfoisophthalate. Examples of additional difunctional monomers containing a —SO$_3$M group attached to an aromatic nucleus include metal salts of aromatic sulfonic acids or their respective esters of the formula I:

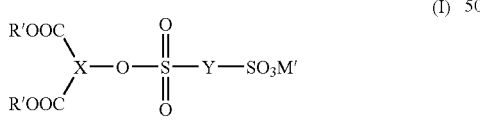
(I)

wherein X is a trivalent aromatic hydrocarbon radical, Y is a divalent aromatic hydrocarbon radical, R' is hydrogen or an alkyl group of one to four carbon atoms and M is defined above. Examples of preferred monomers of formula (I) include, but are not limited to, 4-sodiosulfophenyl-3,5-dicarbomethoxybenzenesulfonate, 4-lithiosulfophenyl-3,5-dicarbomethoxybenzenesulfonate and 6-sodiosulfo-2-naphthyl-3,5-dicarbomethoxybenzenesulfonate. Still other effective difunctional monomers containing a —SO$_3$M group attached to an aromatic nucleus include metal salts of sulfodiphenyl ether dicarboxylic acids or esters thereof of the formula (II):

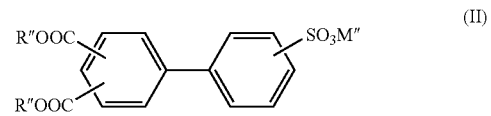
(II)

wherein R" is hydrogen, an alkyl group of one to eight carbon atoms, or phenyl and M is defined above Examples of preferred monomers include, but are not limited to, dimethyl 5-[4-(sodiosulfo)-phenoxy]isophthalate, dimethyl 5-[4-(sodiosulfo)phenoxy]terephthalate, and 5-[4-(sodiosulfo)phenoxy]isophthalic acid. Additional examples of such monomers are disclosed in U.S. Pat. No. 3,734,874, incorporated herein by reference.

The type and amount of sulfomonomer selected to provide water dispersability can be varied to obtain useful ion-containing polyesters. As little as 2 weight percent, based on the total weight of the reactants employed in the synthesis of the polyester composition, will impart a significant degree of water miscibility. However, at least 3 percent is preferred. Water-soluble or water-dispersible polyesters may be formulated with as much as 20 weight percent of the sulfomonomer. The sulfomonomer preferably is a metal sulfonate-containing monomer such as 5-sodiosulfoisophthalic acid, dimethyl 5-sodiosulfoisophthalate, lithium 5-sulfoisophthalic acid, dimethyl lithium 5-sulfoisophthalate, potassium 5-sulfoisophthalic acid, dimethyl potassium 5-sulfoisophthalate, 3-sodiosulfobenzoic acid, and the like.

Optionally, the sulfomonomer containing at least one sulfonate group that may be reacted with a polyol to produce a polyol (e.g. a diol) sulfomonomer adduct may be a monofunctional sulfomonomer containing at least one sulfonate group that may be reacted with a polyol containing at least three hydroxyl groups. The monofunctional sulfomonomer is preferably selected from the following group of sulfomonomers:

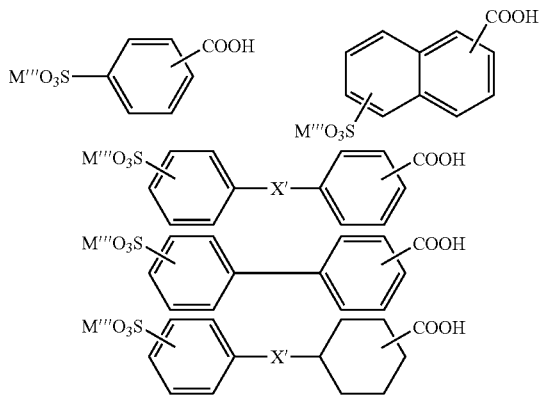

where X' is CH$_2$, SO$_2$, or O and M is defined above. When the polyol sulfomonomer adduct is prepared by reacting a difunctional sulfomonomer with a polyol, the polyol is preferably a diol. Suitable examples of diols include those described above with the following diols being some of the preferred: ethylene glycol, diethylene glycol, 2,2,4-trimethyl-1,3-pentanediol, 1,4-cyclohexanedimethanol, 1,3-cyclohexanedimethanol, hydroxypivalyl hydroxypivalate, dipropylene glycol, 1,6-hexanediol, 1,10-decanediol, 1,3-butanediol, hydrogenated bisphenol A, 1,4-butanediol and neopentyl glycol. In addition to the polyol used in the preparation of the sulfomonomer adduct from a monofunctional sulfomonomer, an additional amount of a polyol or other branching agent such as a polycarboxylic acid may be used to increase the molecular weight and branching of the waterborne polyester resin. These branching agents are preferably selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

A catalyst may be used to promote the formation of the polyester resins. The optional catalyst may be any catalyst known in the art used in the formation of a polyester resin. Preferably, the catalyst is an acid catalyst, such as, for example, FASCAT 4100. The amount of catalyst added promotes the formation of a polyester resin, as described above, and may be determined by routine experimentation as understood by those skilled in the art. Preferably, a catalyst is added in amounts ranging from about 0.01 to 1.0 weight percent, based on the total weight of the reactants.

The polyester resins may be prepared at a temperature range of about 170-250° C. The polyesters utilized in the present invention preferably have a hydroxyl number of about 30 to 180, an acid number of 0 to about 100, and a number average molecular weight of about 700 to about 5000. It should be noted that the acid numbers stated in this invention include only the carboxyl groups, and not the acetoacetate groups, although the acetoacetate groups are also acidic and can increase the acid numbers.

In a preferred embodiment of the present invention, the AcAc-modified polyester has an hydroxyl number of about 30 to 180, an acid number of about 0 to 100, a number average molecular weight of about 700 to about 5000 and a Tg of about −50 to 30° C. comprising:

(i) about 10 to 40 mol percent of residues of a diol,
(ii) about 2 to 20 mol percent of residues of a polyol,
(iii) about 20 to 40 mol percent of a polyacid,
(iv) 0 to about 10 mol percent of residues of a monofunctional acid, and
(v) about 2 to 10 mol percent of residues of a sulfomonomer, wherein the mole percents are based on the total moles of (i), (ii), (iii), (iv), and (v); and about 3 to about 30 weight percent, based on the total weight of the AcAc modified polyester, of acetoacetate residues. Preferably, the diol residues comprise residues of neopentyl glycol, diethylene glycol or a mixture thereof, the polyol residues comprise trimethylolpropane residues, and the polyacid residues comprise residues of isophthalic acid, adipic acid or mixtures thereof. The sulfomonomer residues preferably comprise the residues of 5-sodiosutfoisophthalic acid.

Another group of preferred acetoacetylated polymers comprise addition or vinyl polymers comprising polymerized residues of ethylenically-unsaturated, polymerizable compounds or monomers having pendant and/or terminal acetoacetate groups. Acetoacetate groups may be incorporated into the addition polymers by the use of an acetoacetate monomer such as 2-(acetoacetoxy)ethyl methacrylate (AAEM), 2-(acetoacetoxy)ethyl acrylate (AAEA) 2-(acetoacetoxy)propyl methacrylate, 2-(acetoacetoxy)propyl acrylate, and the like. Suitable ethylenically-unsaturated monomers that may be used to copolymerize with the above acetoacetate-functional monomers to yield polymers include, but are not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, α-methyl styrene, vinyl naphthalene, vinyl toluene, chloromethyl styrene, glycidyl methacrylate, carbodiimide methacrylate, $C_1$-$C_{18}$ alkyl crotonates, di-n-butyl maleate, α- or β-vinyl naphthalene, di-octyl maleate, allyl methacrylate, di-allyl maleate, di-allyl malonate, methyoxybutenyl methacrylate, isobornyl methacrylate, hydroxybutenyl methacrylate, 2-hydroxyethyl(meth)acrylate, 2-hydroxypropyl(meth)acrylate, acrylonitrile, vinyl chloride, vinylidene chloride, vinyl acetate, vinyl ethylene carbonate, 3,4-epoxy-1-butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl (meth)-acrylates, isopropenyl(meth)acrylate, cycloaliphaticepoxy(meth)acrylates, ethylform-amide, 4-vinyl-1,3-dioxolan-2-one, 2,2-dimethyl-4 vinyl-1,3-dioxolane, 3,4-diacetoxy-1-butene, acrylic acid, methacrylic acid, itaconic acid, crotonic acid, and monovinyl adipate. t-butylaminoethyl methacrylate, dimethylaminoethyl methacrylate, diethylaminoethyl methacrylate, N,N-dimethylaminopropyl methacrylamide, 2-t-butylamino-ethyl methacrylate, N,N-dimethylaminoethyl acrylate, N-(2-methacryloyloxy-ethyl) ethylene urea, and methacrylamido-ethylethylene urea. Additional monomers are described in *The Brandon Associates,* 2nd edition, 1992 Merrimack, N.H., and in *Polymers and Monomers,* the 1966-1997 Catalog from Polyscience, Inc., Warrington, Pa., U.S.A. It is preferred that the one or more of the above-described acetoacetate-functional monomers are copolymerized with one or more monomers selected from methyl methacrylate, butyl acrylate, styrene, 2-ethylhexyl acrylate, methacrylic acid and acrylic acid.

A preferred addition polymer comprises monomer residues of both 2-(aceto-acetoxy)ethyl(meth)acrylate and (meth)acrylic acid in the polymer backbone. Preferred 2-acetoacetoxyethyl(meth)acrylate monomer weight percent is 10-80% and (meth)acrylic acid is 2-20%, based on the total weight of the monomers. Most preferred are polymers containing about 20 to 60 weight percent 2-(acetoacetoxy)-ethyl (meth)acrylate residues and about 4 to 10 weight percent (meth)acrylic acid residues.

The AcAc-modified addition polymers may be prepared by chain-growth copolymerization of one or more ethylenically-unsaturated monomers having acetoacetate functionality with other ethylenically-unsaturated monomers. The preferred method for chain-growth copolymerization is free-radical emulsion polymerization to yield latexes having acrylic acetoacetate polymers dispersed in water. The preparation of a latex polymer emulsion containing 2-acetoacetoxyethyl methacrylate (AAEM) as one of the acrylic monomers has been reported as early as in 1971 in U.S. Pat. No. 3,554,987. Examples of ethylenically unsaturated monomers having AcAc functionality, i.e., containing acetoacetoxy residues, include, 2-aceto-acetoxyethyl methacrylate, 2-acetoacetoxyethyl acrylate, 2-acetoacetoxypropyl methacrylate, 2-acetoacetoxypropyl acrylate, and the like.

The polymerization process by which the water-based latex dispersions are made also may require an initiator, a reducing agent, or a catalyst. Suitable initiators include conventional initiators such as ammonium persulfate, ammonium carbonate, hydrogen peroxide, t-butylhydroperoxide, ammonium or alkali sulfate, di-benzoyl peroxide, lauryl peroxide, di-tertiarybutylperoxide, 2,2'-azobisisobuteronitrile, benzoyl peroxide, and the like. Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof. Suitable catalysts are those compounds which promote decomposition of the polymerization initiator under the polymerization reaction conditions thereby increasing the rate of polymerization. Suitable catalysts include transition metal compounds. Examples of such catalysts include, but are not limited to, ferrous sulfate heptahydrate, ferrous chloride, cupric sulfate, cupric chloride, cobalt acetate, cobaltous sulfate, and mixtures thereof.

Optionally, a conventional surfactant or a combination of surfactants may be used as a co-stabilizer or co-surfactant, such as an anionic or non-ionic emulsifier, in the suspension or emulsion polymerization preparation of a hybrid latex. Examples of preferred surfactants include, but are not limited to, alkali and ammonium alkyl-sulfates, alkylsulfonic acids, fatty acids, oxyethylated alkylphenols, and any combination of anionic or non-ionic surfactant. Preferred surfactants are sodium lauryl sufate, DOWFAX 2A1 (alkyl diphenyl oxide disulfonate available from Dow Chemical Co.) and DISPONIL FES 32 (sodium lauryl ether sulfate, available from Cognis Corp. Ambler, Pa.). A list of suitable surfactants is available in the treatise: *McCutcheon's Emulsifiers & Detergents*, North American Edition and International Edition, MC Publishing Co., Glen Rock, N.J., 1993.

The formaldehyde reactivity of the AcAc polymeric materials may be enhanced by reaction of the acetoacetate residues with a base such as, for example, ammonium hydroxide, sodium hydroxide, potassium hydroxide, triethylamine, N,N-dimethylethanolamine, and the like. Thus, another embodiment of the present invention comprises a substrate coated with an acetoacetate-functional compound, oligomer or polymer wherein the acetoacetate residue is neutralized or reacted with a base. The preferred pH of the resulting liquid containing a neutralized acetoacetate-functional compound is 7.5-10.5.

Further embodiments of our invention concern (1) a liquid coating composition comprising an acetoacetate-functional polymer and a mild oxidizing agent and (2) substrates such as fibers coated with such a coating composition. Examples of mild oxidizing agents include Cu (II), Mn (IV), Fe (III), and Sn (IV) compounds. Mild oxidizing agents based on Cu(II) have been found to be stable over time. A sample of an AcAc polyester dispersion containing 1.7% $CuSO_4$ was found to remain effective in adsorbing formaldehyde after several months. The concentration of the metal oxidizing agents may range from about 1 to 10%, more typically from about 2 to 5%, based on the total weight of the polymer. Oxidation catalysts may be used to catalyze the oxidation of formaldehyde to formate or other products in the presence of oxygen in air. Addition of such oxidation catalysts to the AcAc polymers therefore can enhance the efficiency of the filter media of this invention. Metal ions such as Cu (II), Fe (III), and Al (III) are capable of forming complexes with the acetoacetate functionality on the polymer chains and function as oxidation catalysts. Thus, this present invention includes AcAc polymeric materials containing a metal acetylacetonate complex formed in situ to increase the efficiency of the filter medium containing the AcAc polymeric material. Examples of the metal compounds that may be added to the AcAc polymer dispersion to function as oxidation catalysts includes salts of Cu (II), Co (II), Co (III), Zr (II), Ca (II), Fe (III), VO (II), Al (III), and Cr (III). Examples of such salts include $CuSO_4$, $CuCl_2$, $Al_2(SO_4)_3$, $CrCl_3$, $FeCl_3$, $CoCO_3$, and $CoCl_2$. Cu(II) salts are most preferred. Preformed metal acetylacetonates comprising the above-described metal ions also may be used to prepare metal-modified AcAc polymers. Preferred ratio of the metal compounds is <5%, based on the weight of the AcAc compound.

The acetoacetate-bearing polymers may be coated onto a substrate such as a fiber or fibrous material from liquid compositions. Such liquids may be water-based or solvent-based. The AcAc polymers may be dissolved in an organic solvent to reduce viscosity in order to be applied onto substrates. However, it is preferred to utilize a water-based polymer which is user- and environment-friendly and does not leave residual organic solvents in or on filter elements thus fabricated from compositions coated with the AcAc polymers. The substrate used in this invention may be coated by methods commonly used in the coating or textile industry. Examples of some common methods are spraying, brushing, spray drying, dip (immersion) coating, roll coating, curtain coating, rotary screen coating, air knife coating, and gap coating. The AcAc-bearing compositions may be applied first to a substrate to form a coated substrate which can then be fabricated into a filter medium. The coating may also be applied to the substrate component of a finished filter medium. The AcAc-bearing polymeric materials also may function as an adhesive, to which other filter media may be attached. Examples of filter media that may be attached or bonded to the AcAc-bearing polymer adhesive include fibrous materials and powdery materials. The powdery materials may be active materials used for air filtration purpose such as activated carbon, zeolite, silica gel, alumina, baking soda (sodium bicarbonate) or other powdery bases/acids, manganese (IV) oxide or other powdery oxidants, copper(II) acetylacetonate or other oxidation catalysts, and other powders that can be used to remove contaminants in air. The powdery materials may be attached to the AcAc-bearing coating or adhesive by spraying or other suitable application methods.

The filter element provided by the present invention comprises a web of fibers or fibrous material coated with an acetoacetate-bearing polymer substrate as the reactive component capable of removing airborne aldehydes from a gas such as air or tobacco smoke at ambient temperatures. The coated fiber or fibrous material substrate may be obtained by contacting a fiber or fibrous material with a liquid solution or dispersion comprising an acetoacetate-functional polymer. The novel filter elements of our invention preferably have the characteristics of light weight, low cost, stable in air, low pressure drop, safe to handle, and ease of fabrication. Examples of the types of filter elements include woven fabric media, non-woven fabric media, and wet-laid fibrous media as described in *Handbook of Filter Media*, $2^{nd}$ Edition, Derek B Purchas and Ken Sutherland, 2002, Elsevier Science Inc. New York, N.Y. The filter media may be constructed into various types of filter elements commonly used for air filtration. Examples of filter elements include panel filters, roll filters, lint filters, bag filters, cartridge filters, rigid box filters, pleated panel filters, rigid cell filters, HEPA (high efficiency particulate air) filters, ULPA (ultra low penetration air) filters, CAF (automotive cabin air filter) and tobacco smoke filters. The description of various air filters may be found in *NAFA Guide to Air Filtration*, $3^{rd}$ Edition, 2001, National Air Filtration Association, Washington, D.C. The filter media thus constructed also may contain other active materials commonly used for air filtration purpose such as activated carbon, silica gel, zeolite, and alumina. The present invention is concerned primarily with the removal of airborne aldehydes by contacting such airborne aldehydes with a coating capable of reacting with airborne molecular pollutants through nucleophilic attack and/or oxidation. However, in addition to aldehydes, other airborne contaminants, volatile organic compounds (VOC), and chemical toxins that are subject to such reactions are within the scope of this invention.

EXAMPLES

The novel compositions and filter media provided by the present invention are further illustrated by the following examples wherein all percentages are by weight unless specified otherwise. A gas chromatography (GC) method was used to evaluate the reactivity of various polymers toward formaldehyde. Samples were prepared by drawing down various aqueous polymer dispersions on clear polyester substrates having a thickness of 0.175 mm (GARDCO, Form P300-70) using a 254 micron (10 mil) applicator. The coatings were allowed to dry at room temperature for one hour and subsequently cut into strips measuring 1×5 cm. Each coated strip then was placed in a 20 ml vial for GC headspace analysis. The coated polyester substrate samples thus prepared were exposed to a certain amount of formaldehyde, e.g., 100 ppm, at either 100° C. or room temperature (RT) for a period of time ranging from 15 to 60 minutes. The headspace of each sample then was analyzed by GC to determine the amount of formaldehyde remaining after the adsorption by the coated polyester substrate.

Example 1

Preparation of Acetoacetate-Functional Polyester

An adduct of neopentyl glycol and 5-sodiosulfoisophthalic acid was first prepared by reacting neopentyl glycol (NPG) (827 g, 7.95 mol), 5-sodiosulfoisophthalic acid (SIP)(536 g, 2.00 mol), water (91.9 g), and the acid catalyst FASCAT 4100 (1.10 g) in a three-neck, round-bottom flask equipped with a mechanical stirrer, a steam-jacketed partial condenser, a Dean-Stark trap, a nitrogen inlet, and a water condenser. The reaction temperature gradually was increased from 110 to 150° C. in a 45-minute period, and the distillate collected in the Dean-Stark trap. The reaction was allowed to continue at 150 to 180° C. for 3 hours, and at 190° C. for 4 to 5 hours, until an acid number of 3.0 mg KOH/g was obtained. A portion of the resultant product was used in the following step.

A separate reactor equipped as described in the previous paragraph was charged with the NPG/SIP adduct (53.20 g) prepared as described in the preceding paragraph, diethylene glycol (22.30 g, 0.21 mol), trimethylolpropane (10.22 g, 0.08 mol), isophthalic acid (22.20 g, 0.13 mol), adipic acid (39.05 g, 0.27 mol), and FASCAT 4100 (0.20 g). The mixture was allowed to react at 170 to 220° C. until 16 mL of condensate (water) were obtained. The reaction mixture was allowed to cool to 100° C. over 90 minutes. to collect a total of 18.5 mL water. t-Butyl acetoacetate (50.00 g, 0.31 mol) then was added to the mixture. The reaction was allowed to continue at 110° C. for 30 minutes, at 120° C. for 20 minutes, and then at 140° C. for 35 minutes to collect a total of 21.5 mL t-butanol in the Dean-Stark trap. The resulting AcAc polymer was allowed to cool to 80° C. and water (270 g) gradually added to give a clear dispersion consisting of 30.3% solids and having a pH of 2.7. The clear dispersion was coated onto polyester film as described above.

Example 2

Acetoacetate-Functional Polyester Containing Cu(II)

A portion (10 g) of the clear polyester dispersion of Example 1 was mixed with 5 g water and 1.8 g of a solution prepared by mixing 15 ml of solution A consisting of 7 g $CuSO_4$ dissolved in 100 g water and 15 ml of solution B consisting of 35 g potassium sodium tartrate and 10 g NaOH dissolved in 100 g water to provide a composition containing about 1.7% $CuSO_4$. The composition thus obtained was coated onto polyester film as described above.

Example 3

Preparation of Acetoacetate-Functional Latex

This example describes the procedure for making a latex having 20% AAEM residues and a Tg 20° C. DISPONIL FES 32 (sodium lauryl ether sulfate, available from Cognis Corp. Ambler, Pa.) was used as the surfactant for the reaction. To a 1-L, water-jacketed kettle equipped with a mechanical stirrer, a water condenser, a nitrogen inlet, and reactant feeding tubes were added water (119.50 g), DISPONIL FES 32 (3.11 g), and ammonium carbonate (0.41 g). The mixture then was gradually heated to 80° C. Separately, three solutions were prepared in the flasks: (1) an initiator solution of ammonium persulfate (APS, 0.55 g), ammonium carbonate (0.92 g), and water (25.00 g), (2) a kicker solution of ammonium persulfate (0.83 g) and water (12.53 g), and (3) a monomer pre-emulsion of methyl methacrylate (18.47 g), styrene (146.77 g), 2-ethylhexyl acrylate (122.97 g), methacrylic acid (7.39 g), 2-acetoacetoxyethyl methacrylate (AAEM, 73.90 g), FES 32 surfactant (3.33 g), water (350.00 g), and the chain transfer agent, isooctyl 3-mercaptopropionate (IOMP. 1.85 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion then were simultaneously fed into the reaction kettle over 210 minutes. After the feeding was complete, the reaction was allowed to continue for another 30 minutes. A chaser solution of APS (0.37 g) in water (6.83 g) then was fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen and its % solids and average particle size determined: % Solids=40.5%; PS=102 nm. Average particle size was determined by using Microtrac UPA 150 available from Microtrac, Inc. (Montgomeryville, Pa.) based on a dynamic light scattering method. The emulsion obtained was coated onto polyester film as described above.

Example 4

Preparation of Acetoacetate-Functional Latex

This example describes the procedure for making a latex having 30% AAEM residues and a Tg of 20° C. DOWFAX 2A1 (alkyl diphenyl oxide disulfonate available from Dow Chemical Co.) was used as the surfactant for the reaction. To a 1-L, water-jacketed kettle equipped with a mechanical stirrer, a water condenser, a nitrogen inlet, and reactant feeding tubes were added water (124.00 g), DOWFAX 2A1 (3.11 g), and ammonium carbonate (0.41 g). The mixture then was gradually heated to 80° C. Separately, three solutions were prepared in the flasks: (1) an initiator solution of ammonium persulfate (APS, 0.55 g), ammonium carbonate (0.92 g), and water (25.00 g), (2) a kicker solution of ammonium persulfate (0.83 g) and water (12.53 g), and (3) a monomer pre-emulsion of methyl methacrylate (18.47 g), styrene (125.26 g), 2-ethylhexyl acrylate (107.49 g), methacrylic acid (7.39 g), 2-acetoacetoxyethyl methacrylate (110.85), DOWFAX 2A1 surfactant (14.00 g), water (350.00 g), and the chain transfer agent, isooctyl 3-mercaptopropionate (IOMP, 1.85 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion then were simultaneously fed into the reaction kettle over 210 minutes. After the feeding was complete, the reaction was allowed to continue for another 30 minutes. A chaser solution of APS (0.37 g) in water (6.83 g) then was fed into the mixture over one hour to ensure the completion of the reaction. After the chaser addition was complete, the reaction was held for 30 minutes and subsequently terminated by lowering the temperature to room temperature. The resulting emulsion was then filtered through a 100-mesh wire screen and its % solids and average particle size determined: % Solids=40.8%; PS=109 nm. The emulsion obtained was coated onto polyester film as described above.

Example 5

Preparation of Acetoacetate-Functional Latex

This example describes the procedure for making a latex having 40% AAEM residues and a Tg of 20° C. DOWFAX 2A1 (alkyl diphenyl oxide disulfonate available from Dow Chemical Co.) was used as the surfactant for the reaction. To a 1-L, water-jacketed kettle equipped with a mechanical stirrer, a water condenser, a nitrogen inlet, and reactant feeding tubes were added water (124.00 g), DOWFAX 2A1 surfactant (2.42 g), and ammonium carbonate (0.41 g). The mixture then was gradually heated to 80° C. Separately, three solutions were prepared in the flasks: (1) an initiator solution of ammonium persulfate (APS, 0.55 g), ammonium carbonate (0.92 g), and water (25.00 g), (2) a kicker solution of ammonium persulfate (0.83 g) and water (12.53 g), and (3) a monomer pre-emulsion of methyl methacrylate (18.47 g), styrene (103.75 g), 2-ethylhexyl acrylate (92.08 g), methacrylic acid (7.39 g), 2-acetoacetoxyethyl methacrylate (147.80 g), DOWFAX 2A1 surfactant (14.00 g), water (350.00 g), and the chain transfer agent, isooctyl 3-mercaptopropionate (IOMP, 1.85 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion were then simultaneously fed into the reaction kettle over 210 minutes. After the feeding was complete, the reaction was allowed to continue for another 30 minutes. A chaser solution of APS (0.37 g) in water (6.83 g) was then fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen, and its % solids and particle size determined: % Solids=40.6%; PS=120 nm. The emulsion obtained was coated onto polyester film as described above.

Example 6

Preparation of Acetoacetate-Functional Latex

This example describes the procedure for making a latex having 40% AAEM residues and a Tg of 10° C. Sodium lauryl sulfate (SLS) was used as the surfactant for the reaction. To a 1-L, water-jacketed kettle equipped with a mechanical stirrer, a water condenser, a nitrogen inlet, and reactant feeding tubes were added water (124.00 g), sodium lauryl sulfate (SLS, 0.37 g), and ammonium carbonate (0.41 g). The mixture then was gradually heated to 80° C. Separately, three solutions were prepared in the flasks: (1) an initiator solution of ammonium persulfate (APS, 0.90 g), ammonium carbonate (0.92 g), and water (25.00 g), (2) a kicker solution of ammonium persulfate (0.48 g) and water (12.53 g), and (3) a monomer pre-emulsion of methyl methacrylate (69.76 g), n-butyl acrylate (137.16 g), methacrylic acid (14.78 g), 2-acetoacetoxyethyl methacrylate (147.80 g), SLS 3. (33 g), water (350.00 g), and the chain transfer agent, isooctyl 3-mercaptopropionate (IOMP, 1.78 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion then were simultaneously fed into the reaction kettle over 210 minutes. After the feeding was complete, the reaction was allowed to continue for another 30 minutes. A chaser solution of APS (0.37 g) in water (6.83 g) then was fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen and its % solids and particle size determined: % Solids=41.3%; PS=154 nm. The emulsion obtained was coated onto polyester film as described above.

Comparative example 1

Preparation of Latex without AAEM

This example describes the preparation of a latex having a Tg of 10° C. that does not contain AAEM residues. To a 1-L, water-jacketed kettle equipped with a mechanical stirrer, a water condenser, a nitrogen inlet, and reactant feeding tubes were added water (124.00 g), sodium lauryl sulfate (SLS, 0.37 g), and ammonium carbonate (0.41 g). The mixture was then gradually heated to 80° C. Separately, three solutions were prepared in the flasks: (1) an initiator solution of ammonium persulfate (APS, 0.90 g), ammonium carbonate (0.92 g), and water (25.00 g), (2) a kicker solution of ammonium persulfate 0.48 g and water 12.53 g, and 3) a monomer pre-emulsion of methyl methacrylate (143.14 g), n-butyl acrylate (211.58 g), methacrylic acid (14.78 g), SLS (3.33 g), water (350.00 g), and the chain transfer agent, isooctyl 3-mercaptopropionate (IOMP, 1.85 g).

A portion (37.10 g) of the above monomer pre-emulsion was added to the kettle at 80° C., followed by the addition of the above kicker solution. The mixture was allowed to react for 30 min. to yield latex seed particles. The initiator solution and the monomer pre-emulsion then were simultaneously fed into the reaction kettle over 210 min. After the feeding was complete, the reaction was allowed to continue for another 30 minutes. A chaser solution of APS (0.37 g) in water (6.83 g) was then fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen, and its % solids and particle size determined: % Solids=42.4%; PS=126 nm. The emulsion obtained was coated onto polyester film as described above.

Example 7

Preparation of Acetoacetate-Functional Latex

This example describes the procedure for making a latex having 40% AAEM residues and a Tg of 10° C. To a 1-L, water-jacketed kettle equipped with a mechanical stirrer, a water condenser, a nitrogen inlet, and reactant feeding tubes were added water (124.00 g), sodium lauryl sulfate (SLS, 0.37 g), and ammonium carbonate (0.41 g). The mixture was then gradually heated to 80° C. Separately, three solutions were prepared in the flasks: (1) an initiator solution of ammonium persulfate (APS, 0.90 g), ammonium carbonate (0.92 g), and water (25.00 g), (2) a kicker solution of ammonium persulfate (0.48 g) and water (12.53 g), and (3) a monomer pre-emulsion of methyl methacrylate (69.76 g), n-butyl acrylate (137.16 g), methacrylic acid (14.78 g), 2-acetoacetoxyethyl methacrylate (147.80 g), SLS (3.33 g), water (350.00 g), and the chain transfer agent, isooctyl 3-mercaptopropionate (IOMP, 1.85 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion then were simultaneously fed into the reaction kettle over 210 minutes. After the feeding was complete, the reaction was allowed to continue for another 30 minutes. A chaser solution of APS (0.37 g) in water (6.83 g) was then fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen, and its % solids and particle size determined: % Solids=40.6%; PS=162 nm. The emulsion obtained was coated onto polyester film as described above.

Example 8

Preparation of Acetoacetate-Functional Latex

This example describes the procedure for making a latex containing 40% AAEM residues and a Tg of 0° C. To a 1-L, water-jacketed kettle equipped with a mechanical stirrer, a water condenser, a nitrogen inlet, and reactant feeding tubes were added water (124.00 g), sodium lauryl sulfate (SLS, 0.37 g), and ammonium carbonate (0.41 g). The mixture then was gradually heated to 80° C. Separately, three solutions were prepared in the flasks: (1) an initiator solution of ammonium persulfate (APS, 0.90 g), ammonium carbonate (0.92 g), and water (25.00 g), (2) a kicker solution of ammonium persulfate (0.48 g) and water (12.53 g), and (3) a monomer pre-emulsion of methyl methacrylate (43.23 g), n-butyl acrylate (163.70 g), methacrylic acid (14.78 g), 2-acetoacetoxyethyl methacrylate (147.80 g), SLS (3.33 g), water (350.00 g), and the chain transfer agent, isooctyl 3-mercaptopropionate (IOMP, 1.85 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion then were simultaneously fed into the reaction kettle over 210 minutes. After the feeding was complete, the reaction was allowed to continue for another 30 minutes. A chaser solution of APS 0.37 g in water 6.83 g was then fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen, and its % solids and average particle size determined: % Solids=40.6%; PS=162 nm. The emulsion obtained was coated onto polyester film as described above.

Example 9

Preparation of Acetoacetate-Functional Latex

This example describes the preparation of a latex containing 40% AAEM residues and a Tg of 0° C. but without methacrylic acid. To a 1-L, water-jacketed kettle equipped with a mechanical stirrer, a water condenser, a nitrogen inlet, and reactant feeding tubes were added water (124.00 g), sodium lauryl sulfate (SLS, 0.37 g), and ammonium carbonate (0.41 g). The mixture then was gradually heated to 80° C. Separately, three solutions were prepared in the flasks: (1) an initiator solution of ammonium persulfate (APS, 0.90 g), ammonium carbonate (0.92 g), and water (25.00 g), (2) a kicker solution of ammonium persulfate (0.48 g) and water (12.53 g), and (3) a monomer pre-emulsion of methyl methacrylate (63.51 g), n-butyl acrylate (158.18 g), 2-acetoacetoxyethyl methacrylate (147.80 g), SLS (3.33 g), and water (350.00 g).

A portion (37.10 g) of the above monomer pre-emulsion was added to the kettle at 80° C., followed by the addition of the above kicker solution. The mixture was allowed to react for 30 min. to yield latex seed particles. The initiator solution and the monomer pre-emulsion were then simultaneously fed into the reaction kettle over 210 minutes. After the feeding was complete, the reaction was allowed to continue for another 30 minutes. A chaser solution of APS (0.37 g) in water (6.83 g) then was fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen, and its % solids and particle size determined: % Solids=40.7%; PS=133 nm. The emulsion obtained was coated onto polyester film as described above.

Comparative Example 2

Preparation of Latex without AAEM and MAA

This example describes the preparation of a latex containing no AAEM or methacrylic acid residues and having a Tg of 0° C. To a 1-L, water-jacketed kettle equipped with a mechanical stirrer, a water condenser, a nitrogen inlet, and reactant feeding tubes were added water (124.00 g), sodium lauryl sulfate (SLS, 0.37 g), and ammonium carbonate (0.41 g). The mixture then was gradually heated to 80° C. Separately, three solutions were prepared in the flasks: (1) an initiator solution of ammonium persulfate (APS, 0.90 g), ammonium carbonate (0.92 g), and water (25.00 g), (2) a kicker solution of ammonium persulfate (0.48 g) and water (12.53 g), and (3) a monomer pre-emulsion of methyl methacrylate (136.90 g), n-butyl acrylate (232.60 g), SLS (3.33 g), and water (350.00 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion then were simultaneously fed into the reaction kettle over 210 minutes. After the feeding was complete, the reaction was allowed to continue for another 30 minutes. A chaser solution of APS (0.37 g) in water (6.83 g) then was fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen, and its % solids and particle size determined: % Solids=42.2%; PS=118 nm. The emulsion obtained was coated onto polyester film as described above.

Comparative Example 3

Preparation of Latex without AAEM and MAA

This example describes the preparation of a latex containing no AAEM and methacrylic acid residues and having a Tg of 20° C. To a 1-L, water-jacketed kettle equipped with a mechanical stirrer, a water condenser, a nitrogen inlet, and reactant feeding tubes were added water (124.00 g), sodium lauryl sulfate (SLS, 0.37 g), and ammonium carbonate (0.41 g). The mixture then was gradually heated to 80° C. Separately, three solutions were prepared in the flasks: (1) an initiator solution of ammonium persulfate (APS, 0.90 g), ammonium carbonate (0.92 g), and water (25.00 g), (2) a kicker solution of ammonium persulfate (0.48 g) and water (12.53 g), and (3) a monomer pre-emulsion of methyl methacrylate (188.33 g), n-butyl acrylate (181.17 g), SLS (3.33 g), and water (350.00 g).

A portion (37.10 g) of the above monomer pre-emulsion was added to the kettle at 80° C., followed by the addition of the above kicker solution. The mixture was allowed to react for 30 minutes to yield latex seed particles. The initiator solution and the monomer pre-emulsion were then simultaneously fed into the reaction kettle over 210 minutes. After the feeding was complete, the reaction was allowed to continue for another 30 minutes. A chaser solution of APS (0.37 g) in water (6.83 g) then was fed into the mixture over one hour to ensure the completion of the reaction. After the chaser addition was complete, the reaction was held for 30 minutes and subsequently terminated by lowering the temperature to room temperature. The resulting emulsion then was filtered through a 100-mesh wire screen, and its % solids and particle size determined: % Solids=41.9%; PS=122 nm. The emulsion obtained was coated onto polyester film as described above.

Example 10

Neutralization of Acetoacetate-Functional Latex

To a portion (10 g) of the latex (pH 4.8) prepared according to the procedure of Example 6 were added 0.25 g ammonium hydroxide (30% in water) and 3.30 g water. The mixture was placed on a roller and agitated for two hours and the pH determined to be 8.4. The emulsion obtained was coated onto polyester film as described above.

Example 11

Acetoacetate-Functional Latex Containing Cu (II)

A Cu(II) solution was first prepared by mixing 15 ml of solution $\underline{A}$ consisting of 7 g $CuSO_4$ dissolved in 100 g water and 15 ml of solution $\underline{B}$ consisting of 35 g potassium sodium tartrate and 10 g NaOH dissolved in 100 g water. To a portion (10 g) of the latex (pH 4.8) prepared in Example 6 were added 3.30 g water, 0.25 g ammonium hydroxide (30% in water), and 0.90 g of the above Cu(II) solution. The mixture was placed on a roller and agitated for two hours and the pH determined to be 8.6. The emulsion obtained was coated onto polyester film as described above.

Example 12

Acetoacetate-Functional Latex Containing Zr (II) and Co (II)

To a portion (10 g) of the latex (pH 4.8) prepared from Example 6 were added 3.30 g water, 0.25 g ammonium hydroxide (30% in water), and an aliquot (0.136 g) of a mixture of Zirconium HYDRO-CEM (12%, OMG Americas) (26.9 g), Cobalt HYDRO-CURE II (OMG Americas)(13.1 g), and ethylene glycol monobutyl ether (EB)(10.0 g). The mixture was placed-on a roller for two hours and the pH determined to be 8.3. The emulsion obtained was coated onto polyester film as described above.

A gas chromatography (GC) method was used to evaluate the capability of the coated polyester film samples prepared as described above to remove formaldehyde. Each 1 cm×5 cm coated strip was placed in a 20 ml vial for GC headspace analysis. An amount of formaldehyde, e.g., 100 ppm, was injected into the sample using a diluted solution of 37% formaldehyde in water (containing 10 to 15% methanol). The vial then was sealed and analyzed by GC under various conditions as described below.

Each coated polyester film strip (1 cm×5 cm) prepared as described herein was placed in a 20-ml screw top headspace vial with 15.2 cm (6-inches) Teflon tape wrapped on the outside of the screw thread. A standard solution containing formaldehyde at 2590 ug/ml (PPM w/v) in water or acetone (or other suitable solvent) was prepared. When 1.0-microliter (μl) of this formaldehyde solution was placed into a 20.0-ml headspace vial and the ideal gas law is applied, the concentration of formaldehyde in the 20-ml headspace vial is 100 PPM v/v. A series of headspace vials containing various amounts of this standard solution were prepared and the headspace gas was analyzed to construct a linear calibration curve for formaldehyde quantification. A quantitative amount (in microliters volume, e.g., 1 μl, by using an appropriate syringe) of a known concentration formaldehyde standard solution was added into the bottom of the headspace vial containing a coated film sample without contacting the film sample. The headspace vial then was hermetically sealed immediately with a Silicone/TFE septum screw cap. The prepared headspace vial then was subjected to the desired condition such as at 100° C. for 30 minutes or at room temperature (22° C.) for 60 minutes. The added formaldehyde was expected to be chemically reacted or physically absorbed by the coated materials as indicative of formaldehyde removal from the headspace air.

The determination of parts per million by volume (PPMv) of formaldehyde remaining in the headspace was accomplished by using an automated headspace injector (CTC Combi-PAL by Leap Technologies) and a HP-6890 gas chromatograph (Agilent Technologies)) with a heated split injector and a pulsed discharge detector (PDD)(Valco Instruments Co. Inc.). A 2.0-ml aliquot of the headspace air was injected onto the GC inlet and formaldehyde was separated from other components by using a RTX-624 capillary column (75 meters×0.53 mm ID×3.0 micron film thickness; Restek Corporation) with helium as the carrier gas, and detected by the PDD in helium ionization mode. A formaldehyde calibration curve was constructed by injecting known amounts (calculated as PPMv) of the reference analyte under the same headspace and GC conditions. The PPMv concentration of formaldehyde remaining in the headspace after exposure to the coated polymeric material under the desired condition then was calculated.

Samples of uncoated polyester substrate (Clear Polyester Panels from GARDCO, Form P300-7C) were evaluated in the procedure described above to confirm that the polyester substrate does not release or adsorb formaldehyde under the experimental conditions, e.g., 100° C. for 30 minutes. Samples of the following coated polyester substrates were evaluated for formaldehyde adsorption according to the procedure described herein:

Coated Substrate I: Coated polyester of Example 1.
Coated Substrate II: Coated polyester of Example 5.
Coated Substrate III: Coated polyester of Example 2.

The samples were exposed to 100 ppm HCHO at 100° C. for 30 minutes and the headspace of each vial was analyzed by GC. The results are collected in the Table 1 below wherein Formaldehyde Before is the theoretical concentration of formaldehyde in PPMv in the vial headspace based on the amount of formaldehyde solution injected into the vial, Formaldehyde After is the concentration of formaldehyde in PPMv in the vial headspace at the end of the 30-minute test period, and ND means no formaldehyde was detected.

TABLE 1

| Coated Substrate | Formaldehyde Before | Formaldehyde After |
|---|---|---|
| I | 101.7 | <1 |
| I | 101.7 | <1 |
| II | 101.7 | ND |
| II | 101.7 | ND |
| III | 101.7 | ND |
| III | 101.7 | ND |

Samples of the following coated polyester substrates were evaluated for formaldehyde adsorption according to the procedure described herein:

Coated Substrate IV Coated polyester of Example 6
Coated Substrate V: Coated polyester of Comparative Example 1.

The samples were exposed to 100 ppm HCHO at 100° C. for 30 minutes and the headspace of each vial was analyzed by GC. The results are collected in the Table 2 below wherein Formaldehyde Before, Formaldehyde After and ND have the meanings given above.

TABLE 2

| Coated Substrate | Formaldehyde Before | Formaldehyde After |
|---|---|---|
| IV | 106.6 | <1 |
| IV | 106.6 | ND |
| V | 106.6 | ND |
| V | 106.6 | ND |

In an effort to develop a method for room temperature exposure, experiments were carried out to ensure that the formaldehyde solution was fully vaporized in the headspace of vials. It was found that the formaldehyde solution in water yielded inconsistent results. Based on this, a formaldehyde standard solution was prepared by adding acetone to 0.07 g of 37% formaldehyde water solution in a 10-ml volumetric flask and diluting to the mark. This formaldehyde standard solution in acetone was found to give consistent results in the headspace analysis and therefore was utilized for room temperature exposure study.

Samples of coated polyester substrates I, IV and V were evaluated for formaldehyde adsorption at room temperature according to the procedure described herein. The samples were exposed to formaldehyde for 30 to 50 minutes and the headspace of each vial was analyzed by GC. The results are collected in the Table 3 below wherein Time is the time in minutes of the exposure to formaldehyde prior to analysis and Formaldehyde Before and Formaldehyde After have the meanings given above.

TABLE 3

| Coated Substrate | Time | Formaldehyde Before | Formaldehyde After |
|---|---|---|---|
| I | 35 | 99.9 | 8.02 |
| IV | 30 | 99.9 | 21.83 |
| V | 50 | 99.9 | 8.72 |

The AcAc polyester (I) showed good adsorption at room temperature. However, the AcAc latex (IV) was surprisingly found to have a higher detection than the latex without AcAc groups (V). The reactivity of the non-AcAc latex was believed to be related to physical adsorption and the methacrylic acid moiety, which was further investigated below.

Samples of the following coated polyester substrates were evaluated for formaldehyde adsorption at room temperature (22° C.) for 30 minutes according to the procedure described herein:

Coated Substrate VI: Polyester coated with Aerosol A-102 surfactant
Coated Substrate VII: Coated polyester of Example 8
Coated Substrate VIII: Coated polyester of Example 9
Coated Substrate IX: Polyester coated with Aerosol OT-70

Coated Substrate VI consisted of polyester film coated as described above with Aerosol A-102 surfactant, 30% disodium salt of the half ester of sulfosuccinic acid in water (Cytec). Coated Substrate IX consisted of polyester film coated as described above with Aerosol OT-702 surfactant, 30% sodium dioctyl sulfosuccinic acid in a water-ethanol mixture. The results are collected in the Table 4 below wherein Formaldehyde Before and Formaldehyde After have the meanings given above.

TABLE 4

| Coated Substrate | Formaldehyde Before | Formaldehyde After |
|---|---|---|
| VI | 94.0 | 3.0 |
| VII | 94.0 | 12.4 |
| VIII | 94.0 | 38.2 |
| IX | 94.0 | 8.3 |

In an effort to determine the nature of the adsorption mechanism (physical versus chemical), after Coated Substrate VI, VII, VIII and IX had been evaluated for formaldehyde adsorption at room temperature, the vials containing the coated substrates evaluated were heated at 100° C. for 15 minutes. The headspaces of each vial was again analyzed. The results are collected in the Table 5 below wherein Formaldehyde Before and ND have the meanings given above and Formaldehyde After refers to the formaldehyde concentration in the headspace after heating at 100° C. for 15 minutes.

TABLE 5

| Coated Substrate | Formaldehyde Before | Formaldehyde After |
|---|---|---|
| VI | 94.0 | 75.0 |
| VII | 94.0 | ND |
| VIII | 94.0 | 5.0 |
| IX | 94.0 | 63.8 |

The data reported in Table 5 show that the substrates coated with an AcAc-containing polymer retain high adsorption at elevated temperature. In contrast, a large ratio of the formaldehyde absorbed by the substrates coated with a surfactant was recovered at the elevated temperature. The recovery of formaldehyde upon heating was a good indication that the surfactant captured formaldehyde physically and not chemically reacted. The results of this evaluated establish that the adsorption by the surfactant coating is physical whereas the adsorption by the AcAc-containing polymers is chemical in nature and is irreversible.

Samples of the following coated polyester substrates were evaluated for formaldehyde adsorption at room temperature (22° C.) for 30 minutes and at 100° C. for 15 minutes according to the procedure described herein:
Coated Substrate IX: Polyester coated with Aerosol OT-70
Coated Substrate X: Coated polyester of Comparative Example 2
Coated Substrate XI: Coated polyester of Comparative Example 3

The results are collected in the Table 6 below wherein Time is the time on minutes of the exposure to formaldehyde prior to analysis, Temp is the temperature of the test vial during the evaluation and Formaldehyde Before and Formaldehyde After have the meanings given above,

TABLE 6

| Coated Substrate | Time | Temp | Formaldehyde Before | Formaldehyde After |
|---|---|---|---|---|
| IX | 30 | 22° C. | 108 | 82.39 |
| X | 30 | 22° C. | 108 | 32.93 |
| XI | 30 | 22° C. | 108 | 46.85 |
| X | 15 | 100° C. | 108 | 61.40 |
| XI | 15 | 100° C. | 108 | 66.59 |

Both samples of acrylic latexes without AAEM and MAA showed moderate adsorption at RT and poor adsorption at 100° C., indicating that either AAEM or MAA was required for the effective elimination of formaldehyde.

Samples of the following coated polyester substrates were evaluated for formaldehyde adsorption at room temperature (22° C.) for 30 minutes according to the procedure described herein:
Coated Substrate IV Coated polyester of Example 6
Coated Substrate XII: Coated polyester of Example 10
Coated Substrate XIII: Coated polyester of Example 12
Coated Substrate XIV: Coated polyester of Example 11
Coated Substrate III: Coated polyester of Example 2.

The results are collected in the Table 7 below wherein Formaldehyde Before, Formaldehyde After and ND have the meanings given above,

TABLE 7

| Coated Substrate | Formaldehyde Before | Formaldehyde After |
|---|---|---|
| IV | 91.6 | 15.4 |
| XII | 91.6 | ND |
| XIII | 91.6 | ND |
| XIV | 91.6 | ND |
| III | 91.6 | ND |

The evaluations described in the preceding paragraph were repeated for Coated Substrate XII, XIII, XIV and III except that the initial concentration of formaldehyde was 242 PPM rather than 91.6 PPM. The results are collected in Table 8 below wherein Formaldehyde Before, Formaldehyde After and ND have the meanings given above,

TABLE 8

| Coated Substrate | Formaldehyde Before | Formaldehyde After |
|---|---|---|
| XII | 242 | 1 |
| XIII | 242 | 2.37 |
| XIV | 242 | 2.95 |
| III | 242 | 0.09 |

The invention has been described in detail with particular reference to preferred embodiments thereof, but it will be understood that variations and modifications can be effected within the spirit and scope of the invention.

We claim:

1. A method for the removal of a gaseous aldehyde from a gas which comprises contacting a gas containing a gaseous aldehyde with a filter medium comprising a filter support material comprising fibers or fibrous materials, a polymeric composition containing acetoacetate residues, and a metallic oxidizing agent or oxidation catalyst selected from compounds of Cu (II), Mn (IV), Fe (III), Sn (IV), Co (II), Co (III), Zr (II), Ca (II), VO (II), Al (III), and Cr (III); wherein the polymeric composition is selected from condensation polymers, addition polymers, epoxy resins, polysiloxanes, cellulose and cellulose esters.

2. The method of claim 1 wherein the filter medium comprises a filter support material coated with a polymeric composition containing acetoacetate residues, wherein the polymeric composition is selected from polyesters, polyurethanes, polyacrylates, polyolefins, polyvinyl alcohols, epoxy resins, polysiloxanes, cellulose, and cellulose esters.

3. The method of claim 2 wherein the filter medium comprises fibers or fibrous materials coated with a polymer containing acetoacetate residues.

4. The method of claim 3 wherein the polymer is a waterborne polyester comprising the reaction product of (a) from about 60 to about 97 weight percent of a polyester resin having a hydroxyl number of at least 15 containing the residue of one or more hydrophilic monomers and (b) from about 3 to about 40 weight percent of an alkyl acetoacetate or diketene.

5. The method of claim 3 wherein the polymer is a waterborne polyester having an hydroxyl number of about 30 to 180, an acid number of about 0 to 100, a number average molecular weight of about 700 to about 5000 and a Tg of about −50 to 30° C. comprising:
  (i) about 10 to 40 mol percent of residues of a diol,
  (ii) about 2 to 20 mol percent of residues of a polyol,
  (iii) about 20 to 40 mol percent of a polyacid,
  (iv) 0 to about 10 mol percent of residues of a monofunctional acid, and
  (v) about 2 to 10 mol percent of residues of a sulfomonomer,
  wherein the mole percents are based on the total moles of (i), (ii), (iii), (iv), and (v); and about 3 to about 30 weight percent, based on the total weight of the AcAc modified polyester, of acetoacetate residues.

6. The method of claim 5 wherein the diol residues comprise residues of neopentyl glycol, diethylene glycol or a mixture thereof, the polyol residues comprise trimethylolpropane residues, the polyacid residues comprise residues of isophthalic acid, adipic acid or mixtures thereof, and the sulfomonomer residues comprise the residues of 5-sodiosutfoisophthalic acid.

7. The method of claim 3 wherein the polymer is an addition polymer comprising the polymerized residues of ethylenically-unsaturated monomers containing acetoacetate residues.

8. The method of claim 7 wherein the polymer is an addition polymer comprising the polymerized residues of ethylenically-unsaturated monomers comprising acrylic, methacrylic acid or a mixtures thereof and at least one monomer selected from 2-acetoacetoxyethyl methacrylate, 2-acetoacetoxyethyl acrylate, 2-acetoacetoxypropyl methacrylate, and 2-acetoacetoxypropyl acrylate.

9. The method of claim 8 wherein the polymer is an addition polymer comprising polymerized residues of ethylenically-unsaturated monomers comprising about 10 to 80 weight percent, based on the total weight of the monomers, of 2-acetoacetoxyethyl acrylate, 2-acetoacetoxyethyl Methacrylate, or mixtures thereof, and about 2 to 20 weight percent, based on the total weight of the monomers, of acrylic acid, methacrylic acid, or mixtures thereof.

10. A method for the removal of a gaseous aldehyde from tobacco smoke containing a gaseous aldehyde which comprises contacting the tobacco smoke with a tobacco smoke filter comprising a filter support material selected from fibers and fibrous material a polymer composition containing acetoacetate residues and a metallic oxidizing agent or oxidation catalyst selected from compounds of Cu (II), Mn (IV), Fe (III), Sn (IV), Co (II), Co (III), Zr (II), Ca (II), VO (II), Al (III), and Cr (III), wherein the polymeric composition is selected from condensation polymers, addition polymers, epoxy resins, polysiloxanes, cellulose and cellulose esters.

11. A method for the removal of a gaseous aldehyde from tobacco smoke containing a gaseous aldehyde which comprises contacting the tobacco smoke with a tobacco smoke filter comprising a filter support material selected from cellulose acetate fibers coated with a metallic oxidizing agent or oxidation catalyst selected from compounds of Cu (II), Mn (IV), Fe (III), Sn (IV), Co (II), Co (III), Zr (II), Ca (II), VO (II), Al (III), and Cr (III), and an acetoacetate (AcAc) modified polyester having an hydroxyl number of about 30 to 180, an acid number of about 0 to 100 and a number average molecular weight of about 700 to about 5000 and a Tg of about −50 to 30° C. comprising:
  (i) about 10 to 40 mol percent of residues of a diol,
  (ii) about 2 to 20 mol percent of residues of a polyol,
  (iii) about 20 to 40 mol percent of a polyacid,
  (iv) 0 to about 10 mol percent of residues of a monofunctional acid, and
  (v) about 2 to 10 mol percent of residues of a sulfomonomer,
  wherein the mole percents are based on the total moles of (i), (ii), (iii), (iv), and (v); and about 3 to about 30 weight percent, based on the total weight of the AcAc modified polyester, of acetoacetate residues.

12. A method for the removal of a gaseous aldehyde from tobacco smoke containing a gaseous aldehyde which comprises contacting the tobacco smoke with a tobacco smoke filter comprising a filter support material selected from fibers and fibrous material, a polymer composition containing acetoacetate residues and a metallic oxidizing agent or oxidation catalyst selected from compounds of Cu (II), Mn (IV), Fe (III), Sn (IV), Co (II), Co (III), Zr (II), Ca (II), VO (II), Al (III), and Cr (III), wherein the filter support material is selected from cellulose acetate fibers coated with the polymeric composition comprising the polymerized residues of ethylenically-unsaturated monomers comprising about 20 to 60 weight percent, based on the total weight of the monomers, 2-acetoacetoxyethyl acrylate, 2-acetoacetoxyethyl methacrylate or mixtures thereof and about 4 to 10 weight percent, based on the total weight of the monomers, acrylic acid, methacrylic acid, or mixtures thereof.

* * * * *